United States Patent [19]

Motegi et al.

[11] Patent Number: 4,687,793
[45] Date of Patent: Aug. 18, 1987

[54] THERMOPLASTIC RESINS CONTAINING GLOXAL HEAT TREATED CELLULOSIC FILLERS

[75] Inventors: Tsutomu Motegi, Sodegaura; Kazuo Aoki, Chiba; Kazuhiro Kimura, Ichihara, all of Japan

[73] Assignee: Chisso Corporation, Osaka, Japan

[21] Appl. No.: 804,142

[22] Filed: Dec. 3, 1985

[30] Foreign Application Priority Data

Dec. 25, 1984 [JP] Japan ............................... 59-275429

[51] Int. Cl.$^4$ .......................... C08K 9/04; C08K 5/07; C08L 1/00
[52] U.S. Cl. ................................ 523/200; 106/163.1; 106/187; 428/403; 524/13; 524/570
[58] Field of Search ............. 428/403; 106/187, 163.1; 524/13; 523/200

[56] References Cited

U.S. PATENT DOCUMENTS 3,912,529 10/1975 Kotani et al. ....................... 524/354
4,013,629 3/1977 Cummisford et al. .............. 528/245
4,196,253 4/1980 Spence ............................. 428/475.8

FOREIGN PATENT DOCUMENTS 48-32929 5/1973 Japan .

OTHER PUBLICATIONS

Derwent Abs 17723c/10 (2-1980) J80005783 Fujigawa Kenzai Kog.
Chem Abs 91-75910j 1979 Young "Wood Fiber" 1978 (10)2 pp. 112-119.

Primary Examiner—Herbert J. Lilling
Attorney, Agent, or Firm—Leydig, Voit & Mayer

[57] ABSTRACT

A cellulosic filler for thermoplastic resins, which, when blended with thermoplastic resins followed by molding, can afford molded products free from deterioration in mechanical strength, stiffness, resistance to thermal deformation, etc., and a thermoplastic resin composition containing the same are provided, which cellulosic filler is a cellulosic filler heat-treated with glyoxal for thermoplastic resins, the quantity of glyoxal being preferably 0.05 to 12% by weight based on unreated cellulosic filler.

4 Claims, No Drawings

THERMOPLASTIC RESINS CONTAINING GLOXAL HEAT TREATED CELLULOSIC FILLERS

BACKGROUND OF THE INVENTION

This invention relates to a cellulosic filler and a thermoplastic resin composition containing the same. More particularly it relates to a cellulosic filler heat-treated with glyoxal and a thermoplastic resin composition containing the same.

Heretofore, a number of attempts to blend cellulosic fillers with thermoplastic resins have been made in order to improve the stiffness, resistance to molding shrinkage, resistance to thermal deformation, coating properties, etc. of the thermoplastic resins.

Cellulosic fillers, however, usually contain moisture around 10% by weight and even when dried by a hot aircirculating dryer at 110° C. for 2–3 hours, the fillers still contain 4–7% by weight of moisture; thus when such cellulosic fillers are blended with thermoplastic resins and the resulting blend is molded, the moisture contained therein is rapidly liberated at molding temperatures of 160° C. or higher to generate steam, resulting in cavities or blisters in the molded product. Occurrence of such cavities deteriorates the physical properties of the molded product such as mechanical strength, stiffness, resistance to thermal deformation, etc., while occurrence of blisters becomes a cause of deforming its apparent shape; thus thermoplastic resins having cellulosic fillers blended therein have not yet been sufficiently practically used.

Further, since moisture-containing cellulosic fillers are tough, they are difficultly disintegrated in processing steps such as in an extrusion molding step; hence a problem occurs whereby it is necessary to use particles which are finely disintegrated to a particle size of 60 to 120 mesh in advance and thus such a disintegration step is required.

The present inventors have made extensive research in order to solve the above problem directed to thermoplastic resins having cellulosic fillers blended therein, and as a result, have found that the above problem can be solved by using cellulosic fillers heat-treated with glyoxal.

SUMMARY OF THE INVENTION

As is apparent from the foregoing, the object of the present invention is to provide a cellulosic filler for thermoplastic resins, which, when blended with thermoplastic resins followed by molding, is able to afford molded products free from deterioration in mechanical strength, stiffness, resistance to thermal deformation, etc., and a thermoplastic resin composition containing the cellulosic filler.

The present invention includes the following compositions:

(1) a cellulosic filler heat-treated with glyoxal for thermoplastic resins;

(2) a cellulosic filler according to the above item (1) wherein said heat treatment is carried out with 0.5 to 12% by weight of glyoxal based on untreated cellulosic filler;

(3) a cellulosic filler according to the above item (1) wherein untreated cellulosic filler is selected from the group consisting of wood flour, wood chip, rice hull, used paper, pulp, cellulose powder and mixtures thereof;

(4) a cellulosic filler according to the above item (1) or (2) wherein untreated cellulosic filler and glyoxal are subjected to heat-mixing treatment at 80° to 150° C. for 1 to 60 minutes;

(5) a thermoplastic resin composition having a cellulosic filler heat-treated with 0.5 to 12% by weight of glyoxal based on untreated cellulosic filler, blended with a thermoplastic resin, the proportion of said heat-mixed cellulosic filler being in the range of 10 to 65% by weight based on said thermoplastic resin composition;

(6) a thermoplastic resin composition according to the above item (5) wherein said untreated cellulosic filler is selected from the group consisting of wood flour, wood chip, rice hull, used paper, pulp, cellulose powder and mixtures thereof;

(7) a thermoplastic resin composition according to the above item (5) wherein said thermoplastic resin is selected from the group consisting of polypropylene, crystalline copolymers of propylene with at least one monomer selected from the group consisting of ethylene, butene-1 and hexene-1, polyethylene, polybutene, polyvinyl chloride, polystyrene, ABS resin, polyacrylic acid esters, polymethacrylic acid esters and mixtures thereof; ethylene-vinyl acetate copolymer; and polyolefins modified with $\alpha,\beta$-unsaturated carboxylic acids or their anhydrides;

(8) a polyolefin resin composition obtained by blending a polyolefin resin selected from the group consisting of polypropylene, crystalline propylene-ethylene copolymer, crystalline propylene-ethylene-butene-1 terpolymer, polyethylene, ABS resin, polystyrene and mixtures thereof, 10 to 65% by weight of an untreated cellulosic filler based on said polyolefin resin composition and 0.5 to 12% by weight of glyoxal based on said untreated cellulosic filler, followed by mixing these materials with heating and subjecting them to melt-kneading treatment.

DESCRIPTION OF PREFERRED EMBODIMENTS

Examples of the untreated cellulosic filler of the present invention are wood flour, wood chip, rice hull, used paper, pulp, cellulose powder, etc. Further, the cellulosic fillers may have a thermosetting resin or an adhesive adhered thereto. Further, the particle size of such untreated cellulosic fillers has no particular limitation, but it is preferred to be finer than 10 mesh. Still further, when the cellulosic fillers are heat-treated with glyoxal, it is preferred to dry the fillers in advance at a temperature of 100° C. or higher for a few hours, e.g. 2–3 hours. It has not yet been clarified what function the glyoxal to be used for treating the cellulosic fillers has, but in view of the fact that glyoxal has a property of reacting with water to form glycolic acid, the function may be presumed as follows: the glyoxal used reacts with moisture contained in cellulosic fillers, particularly with moisture which is difficultly removed by way of drying in the usual manner, to remove the moisture contained in cellulosic fillers.

The quantity of glyoxal used for treating cellulosic fillers is preferably 0.5 to 12% by weight, particularly preferably 2 to 10% by weight based on the weight of the untreated cellulosic fillers.

If the quantity of glyoxal used is less than 0.5% by weight, the effect of removing the moisture contained in cellulosic fillers and the effect of disintegrating cellulosic fillers are small, while if it exceeds 12% by weight, cavities or blisters occur when thermoplastic resins having such cellulosic fillers blended therein are made into a molded product; hence the effect of improving various physical properties of the molded product such as mechanical strength, stiffness, resistance to thermal deformation, etc. cannot be exhibited.

As a process for treating cellulosic fillers with glyoxal, the following are illustrated:

A cellulosic filler is placed in a heatable mixer equipped with a stirrer and heated with stirring to a suitable temperature such as a temperature of 100° C. or higher to subject the cellulosic filler to preliminary drying and thereby remove moisture which is readily liberated, followed by adding a definite quantity of glyoxal to the filler and then subjecting the mixture to a heat-mixing treatment with stirring at a temperature of about 80° C. or higher for one to 60 minutes. Alternatively, in the above mixer equipped with a stirrer are placed definite quantities of a thermoplastic resin, a preliminarily dried cellulosic filler, another additive, another filler if necessary, and glyoxal, followed by subjecting the mixture to a heat-mixing treatment with stirring at a temperature of 80° C. or higher for one to 60 minutes. As the heatable mixer equipped with a stirrer, mixers such as Henschel mixer (tradename), super mixer, etc. may be employed.

Examples of thermoplastic resins used in the present invention are polypropylene, crystalline copolymers of propylene with one or more monomers selected from among ethylene, butene-1, hexene-1 and octene-1, polyethylene, polybutene, polyvinyl chloride, ethylene-vinyl acetate copolymer, polyvinyl acetate, polymethacrylic acid esters (particularly methyl ester), polyacrylic acid esters, polystyrene, ABS resin, modified polyolefins having an unsaturated carboxylic acid or its derivative graft-polymerized thereonto, and mixtures of the foregoing two or more.

The quantity of the cellulosic filler of the present invention blended with the above thermoplastic resins has no particular limitation, but it is practically 10 to 65% by weight, preferably 20 to 55% by weight, more preferably 30 to 50% by weight, based on the weight of the thermoplastic resin composition.

If the quantity blended is less than 10% by weight, only a small effect of improvement in various physical properties such as mechanical strength, stiffness, resistance to thermal deformation, etc. is exhibited with the molded product obtained by molding the resin composition having the cellulosic filler blended therein, while if the quantity exceeds 65% by weight, the melt-fluidity of the resulting resin composition becomes inferior to reduce its moldability and hence make its molding impossible, and even if its molding is possible, the physical properties, particularly impact strength of the resulting molded product lower and hence its utility is lost. Thus it is preferred to adequately choose the quantity blended in accordance with the physical properties of the molded product desired.

Further, in using the cellulosic filler of the present invention, various kinds of additives of the type usually added to thermoplastic resins may be used at the same time, such as antioxidant, heat stabilizer, UV absorber, antistatic agent, neutralizing agent, pigment, dispersing agent, lubricant, plasticizer, synthetic rubbers and inorganic filler such as talc, mica, calcium carbonate, etc.

In producing the thermoplastic resin composition relative to the cellulosic filler of the present invention, a thermoplastic resin, various kinds of additives of the type usually added to the thermoplastic resin and a cellulosic filler heat-treated with glyoxal, each in a definite quantity, may be heat-mixed together with stirring in a mixer such as the above-mentioned Henschel mixer (tradename), followed by melt-kneading the mixture in Banbury mixer (tradename), rolls, extruder or the like and pelletizing the resulting material. Alternatively, a thermoplastic resin, the above-mentioned various kinds of additives, a cellulosic filler and glyoxal, each in a definite quantity, may be subjected to heat-mixing treatment with stirring in a mixer such as the above-mentioned Henschel mixer, followed by melt-kneading the mixture in a Banbury mixer, rolls, an extruder or the like and pelletizing the resulting material.

Further alternatively, a thermoplastic resin, the above-mentioned various kinds of additives, a cellulosic filler and glyoxal, each in a definite quantity, may be heated to a temperature of the melting point of the resin or higher in a mixer such as the above-mentioned Henschel mixer and melt-kneaded with stirring, followed by transferring the resulting melt-kneaded material to a mixer for cooling and cooling it with stirring and then granulating it.

The melt-kneading temperature may be 150° to 300° C., preferably 150° to 250° C. The thus obtained pellets are used for producing molded products according to a molding process corresponding to the object among injection molding, extrusion molding, compression molding, etc.

Molded products produced from the thermoplastic resin composition having the cellulosic filler of the present invention blended therein are free from deleterious effects in various physical properties such as mechanical strength, stiffness, resistance to thermal deformation, etc., originated from the moisture contained in cellulosic fillers, and also the molded products have a nice apparent shape having neither flash nor blister; hence it is possible to use the molded products suitably and advantageously as those in various molding fields. Further, due to the heat treatment with glyoxal, the resulting cellulosic filler contains almost no moisture; hence the cellulosic filler is readily disintegrated at the stage where the filler is blended with the thermoplastic resin and the mixture is subjected to molding processing, so that it is possible to use the cellulosic filler of a relatively large particle size as it is, without finely disintegrating it.

The present invention will be described in more detail by way of Examples and Comparative examples described below.

As the evaluation methods employed in Examples and Comparative examples, the following measurements were conducted:

Measurement of the mechanical strength of molded products:
  according to measurement of tensile strength (according to JIS K6758) and measurement of Izod impact strength (according to JIS K6758).
Resistance to thermal deformation:
  according to measurement of heat distortion temperature (according to JIS K7207).
Measurement of the stiffness of molded products:
  according to measurement of flexural modulus (according to JIS K6758).
Evaluation of the apparent shape:
  according to observation of the presence or absence of cavities in the resulting pellets; observation of the apparent shape of the resulting molded products, that is, the presence or absence of flash and the extent of warpage deformation; and measurement of blister shown below.

Measurement of blister:

With a box as a sample, molded by an injection molding process and having a thickness of 2 mm, a longitudinal side length of 150 mm, a lateral side length of 250 mm and a height of 100 mm, the thickness of a part where thickness is largest among those of the lateral surface of 250 mm×100 mm was measured, and the proportion (%) of the thickness of the part to the standard thickness of 2 mm(i.e. rate of increase in thickness) was calculated. Evaluation was made as follows: —0— less than 2%  —2–less than 2.5% Δ—2.5–less than 3% x—3–less than 4% xx—4% or more

EXAMPLES 1-6 and Comparative examples 1 and 2

Wood flour having a particle size of 80 mesh was placed in a 100 l capacity Henschel mixer (tradename) set to a jacket temperature of 110° C., followed by mixing it with stirring for 15 minutes to carry out preliminary drying, then adding 1% by weight of glyoxal based on the wood flour, and again heat-mixing these with stirring for 15 minutes to obtain a wood flour (A) subjected to heat treatment with 1% by weight of glyoxal. In the same manner as above, wood flour was subjected to heat-mixing treatment with stirring with 5% by weight and 10% by weight of glyoxal, respectively, to obtain a wood flour (B) treated with 5% by weight of glyoxal and a wood flour (C) treated with 10% by weight of glyoxal.

In Examples 1-3, 50% by weight of a propylene homopolymer (CHISSO POLYPRO K1016, tradename of a product manufactured by Chisso Corporation) having a melt flow rate (quantity of resin melt extruded under a load of 2.16 Kg at 230° C. for 10 minutes) of 5 g/10 min. and 50% by weight of wood flour (A) (Example 1), or 50% by weight of wood flour (B) (Example 2), or 50% by weight of wood flour (C) (Example 3) were placed in a Henschel mixer (tradename) set to a jacket temperature of 110° C., followed by heat-mixing these with stirring for 5 minutes, and then melt-knead-extruding the mixture at a melt-kneading temperature of 210° C. from a singlescrew extruder of a bore diameter of 65 mm equipped with a vent to obtain pellets of resin compositions having the respective wood flours incorporated therein.

In Examples 4-6, 50% by weight of a crystalline ethylene-propylene copolymer (CHISSO POLYPRO K7014, tradename of a product manufactured by Chisso Corporation) having a melt flow rate of 3 g/10 min. and 50% by weight of wood flour (A) (Example 4), or 50% by weight of wood flour (B) (Example 5) or 50% by weight of wood flour (C) (Example 6) were placed in a Henschel mixer set to a jacket temperature of 110° C., followed by heat-mixing these with stirring for 5 minutes, and then melt-knead-extruding the mixture at the same temperature as in Examples 1-3 from the same extruder as in Examples 1-3, to obtain pellets of resin compositions having the respective wood flours incorporated therein.

Further, in Comparative examples 1 and 2, 50% by weight of the same ethylene-propylene copolymer as in Examples 4-6 and 50% by weight of a wood flour of a particle size of 80 mesh not subjected to treatment with glyoxal (Comparative exmaple 1) or 50% by weight of a wood flour (D) of a particle size of 80 mesh heat-treated with 15% by weight of glyoxal (Comparative example 2) were mixed on heating with stirring, followed by melt-knead-extruding the mixture in the same manner as in Examples 4-6 to obtain pellets of resin compositions having the respective wood flours incorporated therein.

With the respective pellets obtained in the above Examples and Comparative examples, the appearance of the pellets was observed to examine the presence or absence of cavities. Further, these pellets were injection-molded at a resin temperature of 250° C. to obtain test pieces for measuring various physical properties. With the testpieces, tensile strength, flexural modulus and Izod impact strength were measured. Further, boxes of 150 mm (longitudinal)×250 mm (lateral)×100 mm (high)×2 mm (thick) were prepared by injection-molding, and their surface apparent states were observed to examine the presence or absence of flash and the occurrence of blister. The results are together shown in Table 1.

EXAMPLES 7-12 AND COMPARATIVE EXAMPLES 3 and 4

In Examples 7-9, Example 7 was carried out in the same manner as in Example 1, Example 8, in the same manner as in Example 2, and Example 9, in the same manner as in Example 3, except that a high density polyethylene (CHISSO POLYETHY M690, tradename of a product manufactured by Chisso Corporation) having a melt index (quantity of resin melt extruded under a load of 2.16 Kg at 190° C. for 10 minutes) of 13 g/10 min. was used in a quantity of 50% by weight, to obtain pellets of resin compositions having wood flour incorporated therein.

Further in Examples 10-12, Example 10 was carried out in the same manner as in Example 4, Example 11, in the same manner as in Example 5, and Example 12, in the same manner as in Example 6, except that a mixture (1:1) of the same high density polyethylene as used in Examples 7-9 and a crystalline ethylene-propylene copolymer ( CHISSO POLYPRO K7030, tradename of a product manufactured by Chisso Corporation) having a melt flow rate of 25 g/10 min. was used in a quantity of 50% by weight, to obtain pellets of resin compositions having wood flour incorporated therein.

Further in Comparative examples 3 and 4, Comparative example 4 was carried out in the same manner as in Comparative example 1 except that the same high density polyethylene as used in Examples 7-9 was used, and Comparative example 5, was carried out in the same manner as in Comparative example 1 except that the mixture (1:1) of the same polyethylene and ethylene-propylene copolymer as used in Examples 10-12 was used, to obtain pellets of resin compositions having wood flour incorporated therein.

With the pellets obtained in the above Examples and Comparative examples, the appearance of the pellets was observed to examine the presence or absence of cavities, and also test pieces for measuring the physical properties were prepared by injection molding. With the test pieces, tensile strength, flexural modulus and Izod impact strength were measured. Further, the same boxes as in Examples 1-6 were prepared by injection molding and their surface apparent state was observed to examine the presence or absence of flash and the occurrence of blister. The results are together shown in Table 2.

EXAMPLES 13-15 AND COMPARATIVE EXAMPLES 5 and 6

80% by weight of the above ethylene-propylene copolymer (CHISSO POLYPRO K7014) was mixed with 20% by weight of wood flour (B) (Example 13), 60% by weight of the ethylene-propylene copolymer, with 40% by weight of wood flour (B) (Example 14), and 45% by weight of the ethylene-propylene copolymer, with 55% by weight of wood flour (B) (Example 15), in the same manner as in Examples 4-6, and the respective mixtures were subjected to melt-kneading extrusion in the same as in Examples 4-6 to obtain pellets of resin compositions having wood flour incorporated therein.

In Comparative examples 5 and 6, 95% by weight of the same resin as used in Examples 13-15 was mixed with 5% by weight of wood flour (B) (Comparative example 5), and 30% by weight of the same resin as used in Examples 13-15 was mixed with 70% by weight of wood flour (B) (Comparative example 6), in the same manner as in Examples 13-15 to prepare pellets of resin compositions having wood flour incorporated therein, in all the same manner as in Examples 13-15.

With the pellets obtained in the above Examples and Comparative examples, examination of the presence or absence of cavities in the pellets as observed from their appearance, measurement of various physical properties and examination of the presence or absence of flash and the occurrence of blister in boxes as observed from their appearance were carried out in the same manner as in Examples 1-6 and Comparative examples 1 and 2. The results are together shown in Table 3.

EXAMPLES 16-18 AND COMPARATIVE EXAMPLES 7 and 8

In Examples 16-18, 50% by weight of the above crystalline ethylene-propylene copolymer (CHISSO POLYPRO K7014) having a melt flow rate of 3 g/10 min. was mixed on heating with stirring with 50% by weight of a wood flour (E) heat-treated with 1% by weight of glyoxal and having an average particle diameter of 1 mm (particle size: 18 mesh) (Example 16), or with 50% by weight of a wood flour (F) heat-treated with 5% by weight of glyoxal and having an average particle size of 1 mm (Example 17), or with 50% by weight of a wood flour (G) heat-treated with 10% by weight of glyoxal and having an average particle diameter of 1 mm (Example 18), and pellets of resin compositions having the respective wood flours incorporated therein were prepared in the same manner as in Examples 4-6. In Comparative examples 7 and 8, 50% by weight of untreated wood flour having an average particle diameter of 1 mm was mixed on heating with 50% by weight of the same ethylene-propylene copolymer as used in Examples 16-18 (Comparative example 7), and 50% by weight of a wood flour (H) heat-treated with 0.2% by weight of glyoxal and having an average particle diameter of 1 mm was mixed on heating with 50% by weight of the same ethylene-propylene copolymer as used in Examples 16-18 (Comparative example 8), to prepare pellets of resin compositions having the respective wood flours incorporated therein, in the same manner as in Examples 16-18. The resulting pellets were heated with xylene solvent under reflux at a reflux temperature of xylene for 6 hours to extract the ethylene-propylene copolymer contained in the pellets, followed by taking out the wood flour as extraction residue, and measuring its particle diameter to examine the disintegrated condition of the wood flour at the pelletizing stage. The results are shown in Table 4.

EXAMPLES 19-21 and Comparative examples 9 and 10

Paper pieces of corrugated board (used paper cut) to about 5 mm (longitudinal)×about 5 mm (lateral) were used as a cellulosic filler in place of wood flour. The paper pieces were heat-treated with 1% by weight, 5% by weight or 10% by weight of glyoxal, in the same manner as in Examples 1-6, to obtain paper pieces of corrugated board treated with 1% by weight thereof (A), those treated with 5% by weight thereof (B), and those treated with 10% by weight thereof (C). Each of (A), (B) and (C) in 50% by weight was blended with 50% by weight of the same crystalline ethylene-propylene copolymer as used in Examples 4-6 (Example 19 in the case of (A), Example 20 in the case of (B) and Example 21 in the case of (C)), followed by heat-mixing and melt-kneading extrusion as in Examples 4-6, to obtain pellets of resin compositions having the respective paper pieces of corrugated board incorporated therein.

Further, 50% by weight of untreated paper pieces of corrugated board were blended with 50% by weight of the same ethylene-propylene copolymer as used in Examples 16-18 (Comparative example 9), and 50% by weight of paper pieces (D) heat-treated with 15% by weight of glyoxal were blended with 50% by weight of the same ethylene-propylene copolymer as used in Examples 16-18 (Comparative example 10), followed by preparing pellets of resin compositions having the respective paper pieces of corrugated board incorporated therein in the same manner as in Examples 19-21.

With the pellets obtained in the above Examples and Comparative examples, the appearance of the pellets were observed to examine the presence or absence of cavities, and also test pieces for measuring physical properties were prepared to measure the tensile strength, flexural modulus and Izod impact strength thereof.

Further, in the same manner as in Examples 1-6, boxes were prepared according to injection molding to examine the presence or absence of flash and the occurrence of blister as observed from the surface apparent state. The results are together shown in Table 5.

EXAMPLES 22-24 AND COMPARATIVE EXAMPLES 11 and 12

The respective pellets obtained in Examples 4-6 and Comparative examples 1 and 2 were melt-kneaded at a melt-kneading temperature of 200° C. by means of a single-screw extruder of a bore diameter of 60 mm equipped with a vent and melt-extruded from a T die of 400 mm wide to prepare sheets of 1.5 mm thick. The surface state of the resulting sheets and the condition at the time of extrusion molding of sheets were observed. The results are shown in Table 6.

EXAMPLES 25-27

50% by weight of a wood flour having a particle size of 80 mesh as a cellulosic filler, 10% by weight of glyoxal based on the wood flour and 50% by weight of a propylene homopolymer (CHISSO POLYPRO K1016) having a melt flow rate of 5 g/10 min. (Example 25) or 50% by weight of a crystalline ethylene-propylene copolymer (CHISSO POLYPRO K7014) having a melt flow rate of 3 g/10 min. (Example 26 or 50% by weight of a high density polyethylene (CHISSO POLYETHY M690) having a melt index of 13 g/10 min. (Example 27) were placed in a 100 l capacity Henschel mixer set to a jacket temperature of 110° C., followed by mixing these on heating with stirring, thereafter melt-knead-extruding the blend at a melt-kneading temperature of 210° C. by means of a single-screw extruder of a bore diameter of 65 mm equipped with a vent to obtain pellets of resin compositions having the wood flour incorporated therein.

The appearance of the respective pellets obtained above was observed to examine the presence or absence of cavities, and also with these pellets, test pieces for measuring various physical properties were prepared by injection molding process at a resin temperature of 250° C., to measure the tensile strength, flexural modulus and Izod impact strength of the test pieces.

Further, boxes of 150 mm (longitudinal)×250 mm (lateral)×100 mm (height)×2 mm (thickness) were prepared by injection molding process to examine the presence or absence of flash and the occurrence of blister as observed from the surface apparent state. The results are together shown in Table 7.

TABLE 1

|  | Example | | | | | | Comparative example | |
| --- | --- | --- | --- | --- | --- | --- | --- | --- |
|  | 1 | 2 | 3 | 4 | 5 | 6 | 1 | 2 |
| Resin used | K1016 | | | K7014 | | | K7014 | |
| Cellulosic filler | wood flour (A) | wood flour (B) | wood flour (C) | wood flour (A) | wood flour (B) | wood flour (C) | untreated wood flour | wood flour (D) |
| Pellet appearance: presence or absence of cavities | none | none | none | none | none | none | present | somewhat present |
| Tensile strength (Kg f/cm$^2$) | 283 | 287 | 278 | 267 | 270 | 264 | 235 | 241 |
| Flexural modulus (Kg f/cm$^2$) | 29500 | 30700 | 29200 | 28000 | 29500 | 28300 | 23500 | 23900 |
| Izod impact strength (notched, Kgfcm/cm) | 3.3 | 3.3 | 3.4 | 3.6 | 3.5 | 3.6 | 2.9 | 3.0 |
| Appearance of box: presence or absence of flash | none | none | none | none | none | none | present in large quantity | present |
| Extent of blister | ○ | ◉ | ◉ | ○ | ◉ | ◉ | xx | x |

(Note)
[1] Wood flour (A): wood flour of a particle size of 80 mesh heat-treated with 1% by weight of glyoxal
Wood flour (B): wood flour of a particle size of 80 mesh heat-treated with 5% by weight of glyoxal
Wood flour (C): wood flour of a particle size of 80 mesh heat-treated with 10% by weight of glyoxal
Wood flour (D): wood flour of a particle size of 80 mesh heat-treated with 15% by weight of glyoxal

TABLE 2

|  | Example | | | | | | Comparative example | |
| --- | --- | --- | --- | --- | --- | --- | --- | --- |
|  | 7 | 8 | 9 | 10 | 11 | 12 | 3 | 4 |
| Resin used | M690 | | | M690:K7030 = 1:1 | | | M690:K7030 = 1:1 | |
| Cellulosic filler | wood flour (A) | wood flour (B) | wood flour (C) | wood flour (A) | wood flour (B) | wood flour (C) | untreated wood flour | untreated wood flour |
| Pellet appearance: presence or absence of cavities | none | none | none | none | none | none | present | present |
| Tensile strength (Kg f/cm$^2$) | 232 | 238 | 236 | 245 | 252 | 250 | 220 | 232 |
| Flexural modulus (Kg f/cm$^2$) | 26100 | 26300 | 26200 | 26600 | 27200 | 26700 | 22400 | 22800 |
| Izod impact strength (notched, Kg f cm/cm) | 3.8 | 3.7 | 3.7 | 3.7 | 3.8 | 3.8 | 3.2 | 3.1 |
| Appearance of box: presence or absence of flash | none | none | none | none | none | none | present in large quantity | present in large quantity |
| Extent of blister | ○ | ◉ | ◉ | ○ | ◉ | ◉ | xx | xx |

TABLE 3

|  | Example | | | Comparative example | |
| --- | --- | --- | --- | --- | --- |
|  | 13 | 14 | 15 | 5 | 6 |
| Resin used (K7014) (% by weight) | 80 | 60 | 45 | 95 | 30 |
| Quantity of wood flour (% by weight) | 20 | 40 | 55 | 5 | 70 |
| Pellet appearance: Presence or absence of cavities | none | none | none | none | present |
| Tensile strength (Kg f/cm$^2$) | 258 | 266 | 275 | 250 | 247 |
| Flexural modulus (Kg f/cm$^2$) | 22000 | 26300 | 31000 | 14700 | 36000 |
| Izod impact strength (notched, Kg f cm/cm) | 4.4 | 3.9 | 3.4 | 5.3 | 1.8 |
| Heat distortion temperature (4.6 Kg f/cm$^2$) (°C.) | 126 | 138 | 146 | 117 | 152 |
| Appearance of box: presence or absence of flash | none | none | none | none | present |
| Extent of blister | ◉ | ◉ | ◉ | ◉ | x |

TABLE 3-continued

|  | Example | | | Comparative example | |
|---|---|---|---|---|---|
|  | 13 | 14 | 15 | 5 | 6 |
| Presence or absence of warpage deformation | none | none | none | present | Complete moled product, impossible to prepare |

TABLE 4

|  | Example | | | Comparative example | |
|---|---|---|---|---|---|
|  | 16 | 17 | 18 | 7 | 8 |
| Cellulosic filler | wood flour (E) | wood flour (F) | wood flour (G) | untreated wood flour | wood flour (H) |
| Average particle diameter of wood flour recovered from pellets of cellulosic filler (mm) | 0.55 | 0.48 | 0.54 | 0.85 | 0.80 |

(Note)
Wood flour (E): wood flour of average particle diameter of 1 mm heat-treated with 1% by weight of glyoxal
Wood flour (F): wood flour of average particle diameter of 1 mm heat-treated with 5% by weight of glyoxal
Wood flour (G): wood flour of average particle diameter of 1 mm heat-treated with 10% by weight of glyoxal
Wood flour (H): wood flour of average particle diameter of 1 mm heat-treated with 0.2% by weight of glyoxal

TABLE 5

|  | Example | | | Comparative example | |
|---|---|---|---|---|---|
|  | 19 | 20 | 21 | 9 | 10 |
| Resin used | K7014 | | | K7014 | |
| Cellulosic filler | Paper pieces of corrugated board (A) | Paper pieces of corrugated board (B) | Paper pieces of corrugated board (C) | Untreated paper pieces of corrugated board | Paper pieces of corrugated board (D) |
| Pellet appearance: presence or absence of cavities | none | none | none | none | somewhat present |
| Tensile strength (Kg f/cm$^2$) | 284 | 288 | 285 | 227 | 235 |
| Flexural modulus (Kg f/cm$^2$) | 31700 | 32000 | 31100 | 26000 | 27300 |
| Izod impact strength (notched, kg f cm/cm) | 3.4 | 3.4 | 3.5 | 2.8 | 3.1 |
| Appearance of box: presence or absence of flash | none | none | none | present in large quantity | present |
| Extent of blister | ◎ | ◎ | ◎ | xx | x |

(Note)
Paper pieces of corrugated board (A): paper pieces of corrugated board of 5 × 5 mm heat-treated with 1% by weight of glyoxal
Paper pieces of corrugated board (B): paper pieces of corrugated board of 5 × 5 mm heat-treated with 5% by weight of glyoxal
Paper pieces of corrugated board (C): paper pieces of corrugated board of 5 × 5 mm heat-treated with 10% by weight of glyoxal
Paper pieces of corrugated board (D): paper pieces of corrugated board of 5 × 5 mm heat-treated with 15% by weight of glyoxal

TABLE 6

|  | Example | | | Comparative example | |
|---|---|---|---|---|---|
|  | 22 | 23 | 24 | 11 | 12 |
| Accumulated condition of resinous matter at the exit part of die | almost no accumulation | | | accumulated in large quantity | accumulated in somewhat large quantity |
| Surface smoothness of sheet | good | good | good | intense projections and depressions | Conspicuous projections and depressions |

TABLE 7

|  | Example 25 | Example 26 | Example 27 |
|---|---|---|---|
| Kind of resin used and its quantity used (% by weight) | K1016, 50 | K7014, 50 | M690, 50 |
| Quantity of wood flour used (% by weight) | 50 | 50 | 50 |
| Quantity of glyoxal used, % by weight based on wood flour | 10 | 10 | 10 |
| Pellet appearance: presence or absence of cavities | none | none | none |
| Tensile strength (Kg f/cm$^2$) | 280 | 270 | 240 |

TABLE 7-continued

|  | Example 25 | Example 26 | Example 27 |
| --- | --- | --- | --- |
| Flexural modulus (Kg f/cm$^2$) | 30000 | 29000 | 26000 |
| Izod impact strength (notched, Kg f cm/cm) | 3.3 | 3.6 | 3.8 |
| Appearance of box: presence or absence of flash | none | none | none |
| Extent of blister | ◎ | ◎ | ◎ |

As seen from Tables 1 and 2, in the case of Examples 1-12 wherein wood flour treated with glyoxal in the range of 0.5 to 12% by weight was used, no cavity occurs; various physical properties of tensile strength, impact strength and flexural modulus (stiffness) are all superior; when molded products were prepared from the resulting resin compositions, the apparent shape of the molded products has neither occurrence of flash nor occurrence of blister, that is, the products have a nice appearance, in comparison with the case of Comparative examples 1, 3 and 4 where wood flour was not treated with glyoxal. Further in the case of Comparative example 2 wherein wood flour was treated with 15% by weight of glyoxal, occurrence of cavities was observed somewhat presumably due to the fact that glyoxal or its derivative remaining in the wood flour was in excess; further, various physical properties of tensile strength, impact strength and flexural modulus (stiffness) were lowered; and as to the apparent shape of the resulting molded products, intense flash and blister were observed; thus, practical problems have been noted.

Table 3 shows the examination results of the quantity of the cellulosic filler blend according to the present invention. As seen in Comparative example 5, in the case where the quantity of the cellulosic filler blended is as small as 5% by weight, the resulting molded products have a low flexural modulus and a large warpage deformation; hence practical problems have been raised.

Further, as seen in Comparative example 6, in the case where the quantity of the cellulosic filler blended is as large as 70% by weight, the resulting molded products have a notably reduced impact strength and a reduced fluidity of resin melt, so that it is impossible to obtain molded products of complete shape; hence the above large quantity is not practical.

Table 4 shows the examination results of the disintegration effect of the glyoxal-treated cellulosic filler at the molding processing stage thereof. It is seen from the results that when wood flour not treated with glyoxal was used (Comparative example 7) or wood flour treated with glyoxal in a quantity as small as 0.2% by weight was used (Comparative example 8), such wood flour is difficulty disintegrated at the molding processing stage. Whereas, in the case of Examples 16-18 where wood flour treated with 0.5% by weight or more of glyoxal was used, it was found that the wood flour used was disintegrated to ½ of the original particle diameter at the molding processing stage. This evidences that the cellulosic filler of the present invention is easily finely disintegrated at the molding processing stage; hence it does not matter if preliminarily disintegrated cellulosic filler is not used.

Table 5 shows the results in the case where paper pieces of corrugated board were used as the cellulosic filler in place of wood flour. As seen from the results, it was confirmed that the case of use of used paper such as paper pieces of corrugated board also has a similar effectiveness to that in the case of use of wood flour.

Further, Table 6 shows the examination results of the molding processability of thermoplastic resin composition having the cellulosic filler of the present invention incorporated therein. In the extrusion molding of the thermoplastic resin composition having the product of the present invention incorporated therein, there were observed almost no accumulation of resinous matter at the exit part of die, and the resulting sheets had a much superior surface smoothness.

Further, as seen from Table 7, even when a thermoplastic resin, a cellulosic filler and glyoxal were all at once placed in a stirring mixer and mixed on heating with stirring to simultaneously carry out heat-mixing treatment of the cellulosic filler with glyoxal and mixing treatment of the thermoplastic resin and the cellulosic filler, the resulting resin composition does not cause any cavity, and molded products prepared therefrom also do not cause any flash or blister and exhibit a nice apparent shape, and further are superior in various physical properties of tensile strength, impact strength and flexural modulus (stiffness).

As described above, molded products prepared by blending the cellulosic filler of the present invention with thermoplastic resins and molding the resulting resin oomposition have no reduction in various physical properties such as mechanical strength, stiffness, resistance to thermal deformation, etc., originating from the moisture contained in the cellulosic filler, and also have a good apparent shape without any flash or blister.

What we claim is:

1. A cellulosic filler for thermoplastic resin compositions comprising an untreated cellulosic filler selected from the group consisting of wood flour, wood chips, rice hulls, used paper, pulp, cellulose powder and mixtures thereof heat-mixed with glyoxal at 80° to 150° C. for 1 to 60 minutes to produce a cellulosic filler having almost no moisture.

2. A cellulosic filler according to claim 1 wherein said heat treatment is carried out with 0.5 to 12% by weight of glyoxal based the weight of the untreated cellulosic filler.

3. A thermoplastic resin composition having an untreated cellulosic filler selected from the group consisting of wood flour, wood chips, rice hulls, used paper, pulp, cellulose powder and mixtures thereof heat-mixed at 80° to 150° C. for 1 to 60 minutes with 0.5 to 12% by weight of glyoxal, based on the weight of untreated cellulosic filler, to form a heat-mixed cellulosic filler having almost no moisture, blended with a thermoplastic resin, the proportion of said heat-mixed cellulosic filler being in the range of 10 to 65% by weight, based on the weight of said thermoplastic resin composition.

4. A thermoplastic resin composition according to claim 3 wherein said thermoplastic resin is selected from the group consisting of polypropylene, crystalline copolymers of propylene with at least one monomer selected from the group consisting of ethylene, butene-1 and hexene-1, polyethylene, polybutene, polyvinyl chloride, polystyrene, ABS resin, polyacrylic acid esters, polymethacrylic acid esters and mixtures thereof.

* * * * *